July 22, 1969　　　R. C. SCHLINGER ET AL　　　3,456,897
TWINE SUPPLY HOLDER
Filed April 22, 1968　　　　　　　　　　2 Sheets-Sheet 1
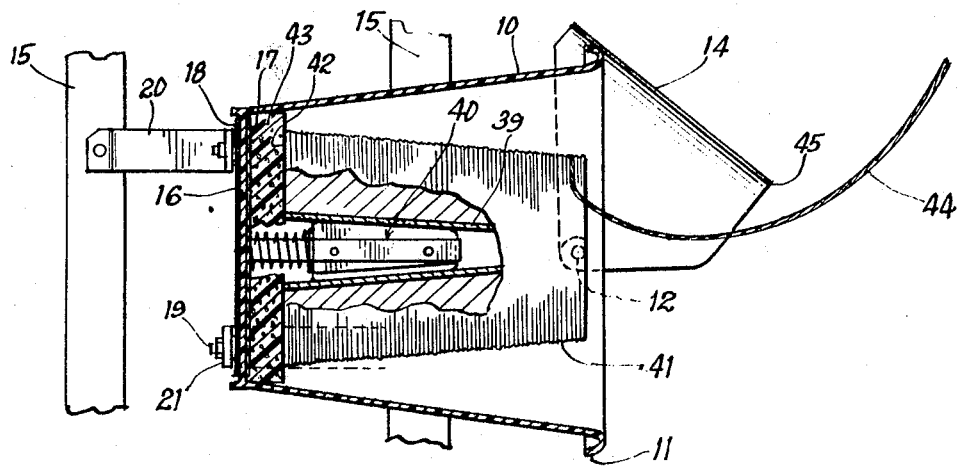
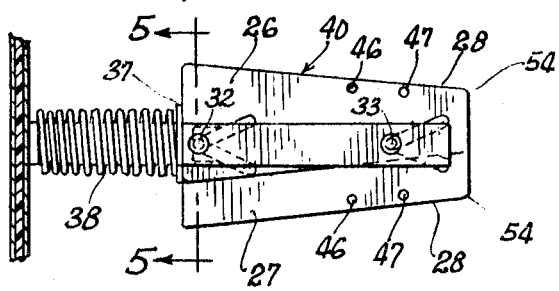
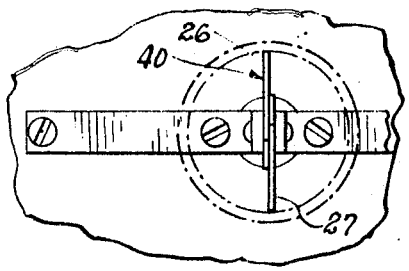
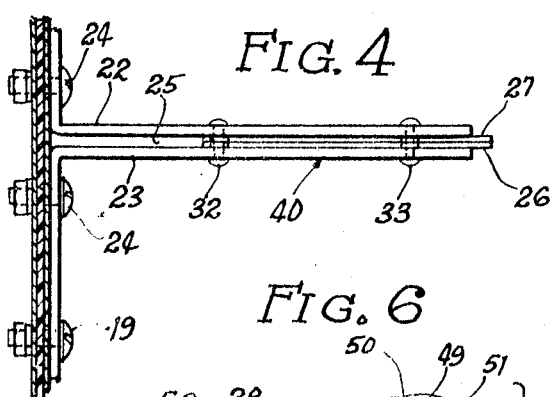
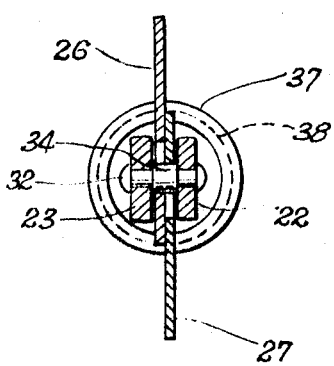
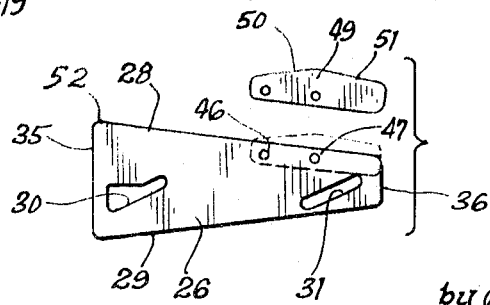
INVENTORS
John R. Hall
Robert C. Schlinger
by David Lucas Brewer
and Brugman Att'ys

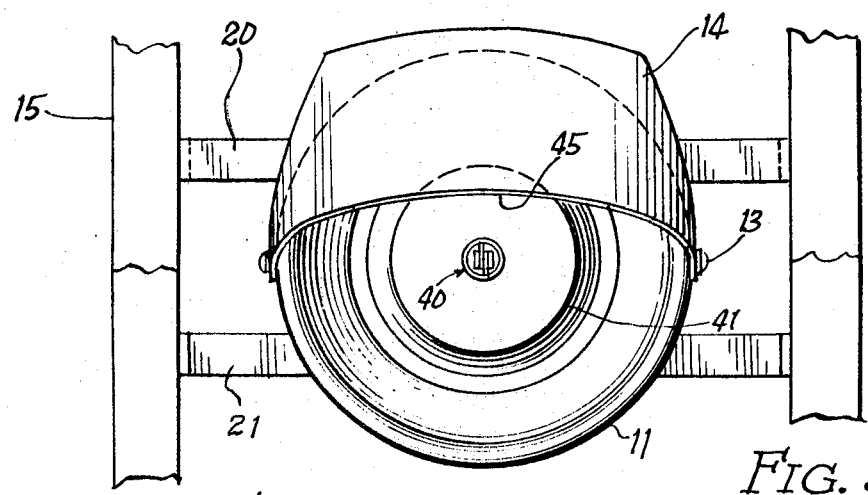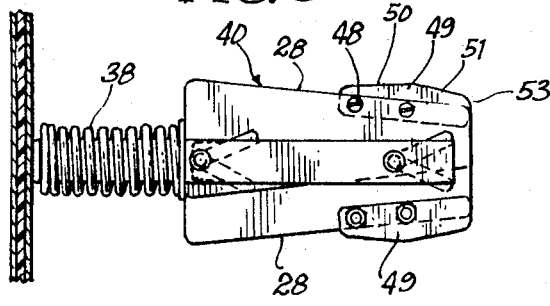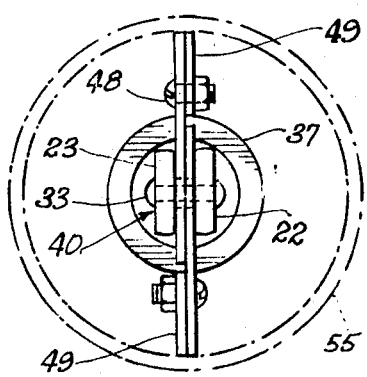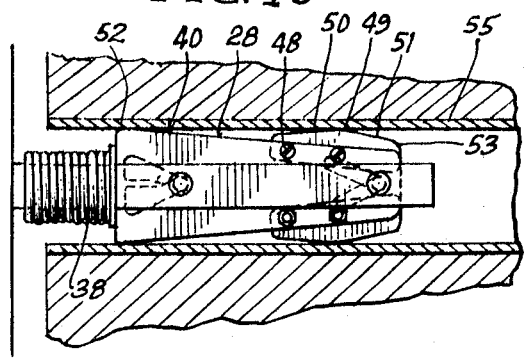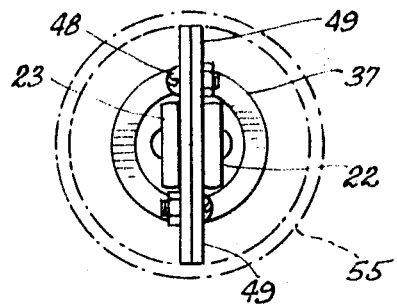

United States Patent Office 3,456,897
Patented July 22, 1969

3,456,897
TWINE SUPPLY HOLDER
Robert Charles Schlinger, Palos Park, and John R. Hall, Chicago, Ill., assignors to B. H. Bunn Company, Chicago, Ill., a corporation of Illinois
Filed Apr. 22, 1968, Ser. No. 722,933
Int. Cl. B65h 49/36
U.S. Cl. 242—141          10 Claims

ABSTRACT OF THE DISCLOSURE

A twine supply holder comprising a protective bucket normally mounted to hold the twine with its core axis horizontal, and a friction type gripping device for the twine in the bucket and extending axially from the bottom of the bucket to engage and hold the hollow core of the twine, the friction device being resiliently expansible to accommodate various sizes and forms of twine cores.

---

This invention relates to twine supply holders which hold a twine supply against movement while twine is unwound therefrom. The invention will be described for illustration purposes with reference to a holder forming part of a twine tying machine of known type.

The twine used in tying machines or the like is extracted from a source of supply in the form of a hollow conical "ball" having a cardboard core on which the twine is wound in layers to form a large twine cone. The latter must be held in one location on the tying machine to avoid having the twine become entangled, and the twine, is it leaves the cone, must be controlled in its movement to avoid contacting moving parts of the machine, or oil or grease which might soil the twine. One twine holder which has been used on tying machines is comprised of a metal bucket-shaped container, to the bottom of which has been secured a pin, or the like, which extends upward centrally of the interior of the container and on which the cardboard cone is frictionally retained. The twine is then passed from the cone in the container through various guide means to the twine arm of the machine.

One difficulty experienced with the pin in the container is that the pin can accommodate but one size of twine cone, whereas the tying machine may be adapted to tie different kinds or weights of twine which may be supplied in twine "balls" of different sizes and shapes.

It is accordingly an object of this invention to provide a holder for a twine supply which will be automatically adjustable to hold cones of different diameters.

A further difficulty which has been encountered in attempting to accommodate different twines is that some are supplied on central cores of different angularity and, in fact, some may be cylindrical in contour. Another object of this invention, therefore, is the provision of a holder for a supply of twine wherein the holder will accept twine cores of different sizes and angularity.

A further object of this invention is to lessen the cost of the container itself by molding it from a plastic material and then compensating for the resultant flexibility of the container by providing stiffening means for the bottom of the container by which the central twine holding pin is supported and by which the container is supported from the frame of the tying machine.

These and other objects of this invention will become apparent from the following detailed description of the invention when taken together with the accompanying drawings in which—

FIG. 1 is a side elevational view in section of the twine cone holder of this invention;

FIGS. 2, 3 and 4 are enlarged side front and plan views of the adjustable portion of the twine holder;

FIG. 5 is an enlarged section taken through FIG. 2 along the line 5—5 in that figure and looking in the direction of the arrows at the ends of said line;

FIG. 6 is an exploded side elevational view of a cone-gripping element of the holder of FIG. 2 and of an adapter therefor;

FIG. 7 is a front elevational view of the twine cone holder of FIG. 1;

FIG. 8 is an enlarged side elevational view of the adjustable portion of the twine holder and the adapter;

FIG. 9 is a still further enlarged front elevational view of the holder of FIG. 8;

FIG. 10 is a side elevational view of the adjustable portion of FIG. 8 shown collapsed and holding a substantially cylindrical twine cone; and FIG. 11 is an enlarged and elevational view of the collapsed adjustable portion of FIG. 10.

The twine holder of this invention in the preferred form selected for illustrative purposes is a molded plastic bucket-shaped container to the inner and outer sides of the bottom of which are bolted stiffening discs, said bolts serving also to hold brackets by which the twine holder is secured to the frame of the machine, and additionally, to hold the central adjustable portion on which the twine cone is directly impaled or mounted.

Referring now to FIG. 1 for a more detailed description of the invention, the twine holder is comprised of a bucket-shaped container 10 of a size large enough to hold the largest supply of twine it is contemplated will be used. Said container is preferably made from polyethylene plastic and may be obtained as a standard item from manufactureres of buckets, if it be desired to avoid making special molds. Such polyethylene buckets are formed with a reversely turned rim 11 for stiffness, and with hollow bosses 12 located diametrically opposite from one another adjacent rim 11 into which a suitable wire bail (not shown) is normally inserted. These openings are used to accept screws 13 (FIG. 7) by which a plastic shield 14 is mounted over the upper portion of the open end of the bucket. Said shield serves to prevent twine extracted from container 10 from becoming entangled with portions of the frame and driving mechanism for the tying machine or the like with which the container is used.

Container 10 is adapted to be secured to a tying machine frame, shown fragmentally at 15 (FIG. 1), with its axis horizontal so that the bottom 16 of the container is substantially vertical. It is understood, however, that the angular disposition of the container relative to the frame of the machine is not material to this invention and may vary to accommodate the machine. The polyethylene of which the container 10 is made is relatively flexible so that its walls cannot be relied upon to support both the container and the twine disposed therein in cantilever position. It is contemplated that container 10 will be supported from its bottom 16 and hence the latter is stiffened by a pair of disc-shaped metal plates 17, 18 disposed one on the inside and the other on the outside of the bottom 16. Said plates are securely fastened to the bottom 16 by screws 19 which pass through both plates and the bottom 16. Said screws also serve to fasten a pair of spaced brackets 20, 21 (FIGS. 1 and 7) to the plate 18 by which container 10 is supported from frame 15.

The twine holder itself is shown generally at 40 in FIGS. 1-4. It is centrally located in container 10 and is comprised of a pair of L-shaped brackets 22, 23 which may be identical in shape and size and fastened to the inner plate 17 by the aforementioned screws 19 and inner screws 24. In the form shown, brackets 22, 23 are made from rigid metal strips which are mounted in opposed and spaced relation to one another so that the horizontal legs of the brackets define a space 25 between them. In space 25 are received substantially identical plates 26, 27 in overlapping relation to one another. Each of said plates 26, 27 has converging edges 28, 29, as shown more clearly in FIG. 6. Each plate 26, 27 is formed with a pair of angled slots 30 and 31 which begin near edge 29 and end at the center of the plate.

Brackets 22, 23 are secured together in the aforesaid spaced relationship by suitable fasteners such as rivets 32, 33, the spaced relationship being determined by bushings 34 disposed between the brackets and through which the rivets pass. Said bushings are preferably free to turn on their respective rivets and are received in slots 30 and 31 in plates 26, 27 so that they function as rollers for the plates. The latter are mounted on the rollers in reversed relationship to one another so that edge 28 of each plate is outermost and serves to contact and support the hollow core of the twine cone. To this end, the slope of the edge 28 is made to coincide with the slope of an element of the central conical support for the twine cone.

The opposed edges 35, 36 of the plates 26, 27, may take any desirable form, but for ease of manufacture are made straight and parallel. Edge 35, as shown in FIG. 2, bears against a washer 37, which, in turn, bears against the closed end of a compression spring 38 encircling the adjacent legs of the brackets 22, 23 at the base of said legs.

It may be observed that with plates 26, 27 mounted loosely between brackets 22, 23 in the space 25, axial pressure on said plates in the direction of the bottom of the container 10 will cause said plates to ride on bushings 34 and move radially inwardly toward one another, thereby reducing the distance between the outside sloping edges 28, and that in the process, spring 38 will be compressed to resist such axial movement. The spring thus provides a force for resiliently expanding the support for the twine cone and both centers the support in the twine cone and holds it frictionally in engagement therewith, the plates 26, 27 functioning as friction shoes for this purpose.

The twine supply, or twine cone as it is generally called, is held on twine holder 40 in the manner shown in FIG. 1. The twine cone may comprise a central hollow frusto-conical core 39 of cardboard or the like on which is wound the twine 41 in layers which retain the conical form of the core 39. The base 42 of the twine cone abuts upon a soft foam rubber disc 43 which is centrally apertured to fit around twine holder 40 and spring 38. Disc 43 functions to protect base 42 from severe blows and also to prevent binding of the twine against the disc 17. The wide opening of the twine cone is pressed axially upon the holder 40 while the latter is in the condition shown in FIG. 2, the rounded corners 54 assisting in getting the smaller cones over the holder, and during the pressing operation, the edges 28 of the plates 26, 27 engage the inner surface of core 39. Said edges then slide along the inner surface of core 39 toward the smaller end of the core 39, which squeezes the plates 26, 27 together and moves them axially relative to bushings 34 against the action of spring 38. The core angle is such that the force of friction between edges 28 and the inner surface of core 39 will not be overcome by the component of the spring force in the direction of ejecting the twine cone, and the latter will thereafter be firmly held on support 40 while the end 44 of the twine is fed through the tying machine.

It may be noted that twine end 44 will be held by edge 45 of shield 14 at a desired distance from parts of the machine located above container 10 and shield 14.

Some tying machines are capable of use with other forms of twine using different core shapes so that the holder 40 should be adaptable for use with different forms of twine cones. For example, a new form of tying material known as polyethylene tape has been found useful where great strength is required. When used in known tying machines, it is merely substituted for the twine normally used, with little or no change in the machine itself. Such tape, however, is supplied on cylindrical cores, and it is wound to produce a cylindrical supply of twine.

To adapt holder 40 to use with cylindrical cores, plates 26 and 27 are formed with two spaced openings 46, 47 (FIGS. 6, 8–11) to accept screws 48 by which specially formed adapters 49 are fastened to the plates 26, 27. Said adapters are preferably made of rigid metal and have obtusely angled outer edges 50, 51. The apex formed by edges 50 and 51 is smoothly rounded, and the distance of said apex from the axis of the holder, i.e., from the axis of the cylindrical cone, is substantially the same as the distance of the end 52 of edge 28 from said axis so that the cylindrical core may be supported by both said apex and end 52.

The leading edge 51 of the adapter 49 slants inwardly and provides a camming surface for engagement with the entering end of a cylindrical core to contract the twine holder as the core is impaled on the holder. The corners 53 (FIG. 8) are rounded, again to assist in starting the smaller cylindrical cores over the holder.

Thus the holder of this invention provides an automatically adjustable means for firmly holding twine cones of various sizes and cone angles, and with the use of the adapters, makes possible the holding of cylindrical cores as well.

We claim:

1. A holder for a twine supply having a wall defining a central opening, said holder comprising a fixed post adapted to be inserted into the central opening, friction means extending radially of the post to grip and support the wall of said central opening, means mounting the friction means on the post for radial and axial movement therein relative to the opening, and resilient means acting upon the friction means to hold said friction means against the wall defined by said central opening.

2. A holder as described in claim 1, said friction means comprising a shoe having aligned outer edge regions which are substantially parallel with an axial element of the central opening, and said mounting means including means for moving said shoe on said post parallel with an axial element of said opening.

3. A holder as described in claim 1, said friction means comprising a shoe having aligned outer edge regions which are substantially parallel with an axial element of the central opening, and said mounting means comprising axially spaced pins on the post and diagonally disposed slots in the shoe through which said pins pass whereby said shoe can move axially and radially with relation to the post while maintaining said edge regions in contact with the wall of the central opening.

4. A holder as described in claim 1, said friction means comprising a plurality of equi-angularly spaced shoes, each having aligned outer edge regions which are substantially parallel with elements of the central opening, and said mounting means including means for moving said shoes on said post in a direction parallel with said elements of the central opening.

5. A holder as described in claim 4, said mounting means comprising axially spaced pins on the post and diagonally disposed slots in the shoe through which said pins pass, whereby said shoes can move axially and radially relative to the post while maintaining said edge regions in contact with the wall of the central opening, and said resilient means acting axially upon said shoes.

6. A holder as described in claim 4, said post being bifurcated, and said shoes being retained between said bifurcations.

7. A holder as described in claim 1, said post having an abutment thereon, said means mounting the friction means on the post comprising pins on the post, said friction means having diagonally disposed slots thereon through which said pins pass, and said resilient means comprising a spring acting axially upon said abutment and upon said friction means to move said friction means on said pins to produce radial movement thereof relative to said post as aforesaid.

8. A holder as described in claim 1, said twine supply central opening being conical, and said friction means having outer edges which are substantially parallel to axial elements of said conical opening.

9. A holder as described in claim 1, said twine supply central opening being substantially cylindrical, said friction means having outer edges which diverge radially with respect to one another, and adapters secured to said friction means and extending radially outwardly from the outer edges thereof at the radially inner regions thereof to contact the twine holder at the central opening thereof.

10. A holder as described in claim 9, said adapter having a tapered forward section adapted to enter the central opening in the holder first, to assist in imparting radial movement to the friction means.

References Cited
UNITED STATES PATENTS

| | | | |
|---|---|---|---|
| 1,759,392 | 5/1930 | De Wolf | 242—130.1 |
| 2,258,262 | 10/1941 | Ross | 242—130.1 |
| 2,738,139 | 3/1956 | Williams et al. | 242—130 |

LEONARD D. CHRISTIAN, Primary Examiner

U.S. Cl. X.R.

279—110; 294—97